United States Patent
McDade et al.

(10) Patent No.: US 7,401,729 B2
(45) Date of Patent: Jul. 22, 2008

(54) SELF SERVICE TERMINAL

(75) Inventors: Fiona McDade, Dundee (GB); Michael R. McNamara, Dundee (GB)

(73) Assignee: NCR Corporation, Dayton, OH (US)

( * ) Notice: Subject to any disclaimer, the term of this patent is extended or adjusted under 35 U.S.C. 154(b) by 379 days.

(21) Appl. No.: 11/217,833

(22) Filed: Sep. 1, 2005

(65) Prior Publication Data

US 2006/0067496 A1    Mar. 30, 2006

(30) Foreign Application Priority Data

Sep. 30, 2004    (GB)  ................... 0421744.4

(51) Int. Cl.
*G07F 19/00*    (2006.01)
(52) U.S. Cl. ...................................... 235/379
(58) Field of Classification Search ................... 235/379
See application file for complete search history.

(56) References Cited

U.S. PATENT DOCUMENTS

| 4,078,257 A | 3/1978 | Bagley |
| 6,639,510 B1 | 10/2003 | Soulie |
| 6,741,235 B1 | 5/2004 | Goren |
| 2004/0066374 A1* | 4/2004 | Holloway et al. ........... 345/168 |

FOREIGN PATENT DOCUMENTS

| DE | 103 06 352 A1 | 9/2004 |
| EP | 0 854 412 A1 | 7/1998 |
| EP | 1 180 753 A2 | 2/2002 |
| GB | 2 167 218 A | 5/1986 |
| GB | 2 275 799 A | 9/1994 |
| JP | 2002354079 A | 12/2002 |
| JP | 2003177861 A | 6/2003 |
| WO | WO 99/39259 A1 | 8/1999 |
| WO | WO 01/94120 A1 | 12/2001 |

* cited by examiner

*Primary Examiner*—Karl D. Frech
(74) *Attorney, Agent, or Firm*—Gregory A. Welte

(57) ABSTRACT

A self service terminal comprises a keyboard including a plurality of separate, individually operable keys having user engageable surfaces. Each key includes a display having an image thereon which is produced by electronic ink. The terminal further comprises a central processing unit (CPU) connected to the keyboard and arranged to control each display to control the image displayed by each respective display.

13 Claims, 2 Drawing Sheets

SELF SERVICE TERMINAL

BACKGROUND

The present invention relates to a self service terminal, such as an automated teller machine (ATM).

At present self service terminals often comprise two separate interfaces: a data entry keyboard and a display screen for displaying instructions or information to a user. The keyboard has a fixed number of keys with the character or characters that each key represents printed on them. Thus, keyboards are manufactured to a specified layout and if a different keyboard layout is required then there would have to be changes in the manufacturing process. Also a disabled person may have difficulty in operating such a terminal, particularly if such a person is visually impaired or has limited use of upper limbs.

It is known that each key of a keyboard can comprise a light emitting diode (LED) or a liquid crystal display (LCD) mounted on its top face whereby the character displayed can be varied. For example, a letter on a key may be changed from upper case to lower case.

It is also known for self service terminals to employ touch screens in which areas on the screen act as keys if they are touched. However, some users find it difficult to key in information on a touch screen since the user does not get a positive tactile response.

SUMMARY

It is an object of this invention to provide a self service terminal having improved user interface means for alleviating the problems referred to above.

According to the present invention there is provided a self service terminal comprising a keyboard including a plurality of separate, individually operable keys having user engageable surfaces, each key including a display having an image thereon which is produced by electronic ink, and a central processing unit (CPU) connected to the keyboard and arranged to control each display to control the image displayed by each respective display.

Preferably, the keys are arranged in an array.

Most preferably, there are three keys in the array, which are operable to facilitate all user input to the terminal Preferably, each key displays a separate image, the images of the keys together forming one of a plurality of keyboard layouts.

In one embodiment each of a plurality of adjoining keys displays part of a full text message, the CPU coordinating the parts to provide the full text message.

Preferably, (i) the function performed by the CPU if a key is pressed, and (ii) the image displayed on the display for said key are both changeable, under the control of the CPU.

Preferably, the keyboard is of a tactile type to provide a user with a positive tactile response from each keystroke made.

BRIEF DESCRIPTION OF THE DRAWINGS

Embodiments of the present invention will now be described, by way of example, with reference to the accompanying drawings, in which.

DETAILED DESCRIPTION

Figure 1:
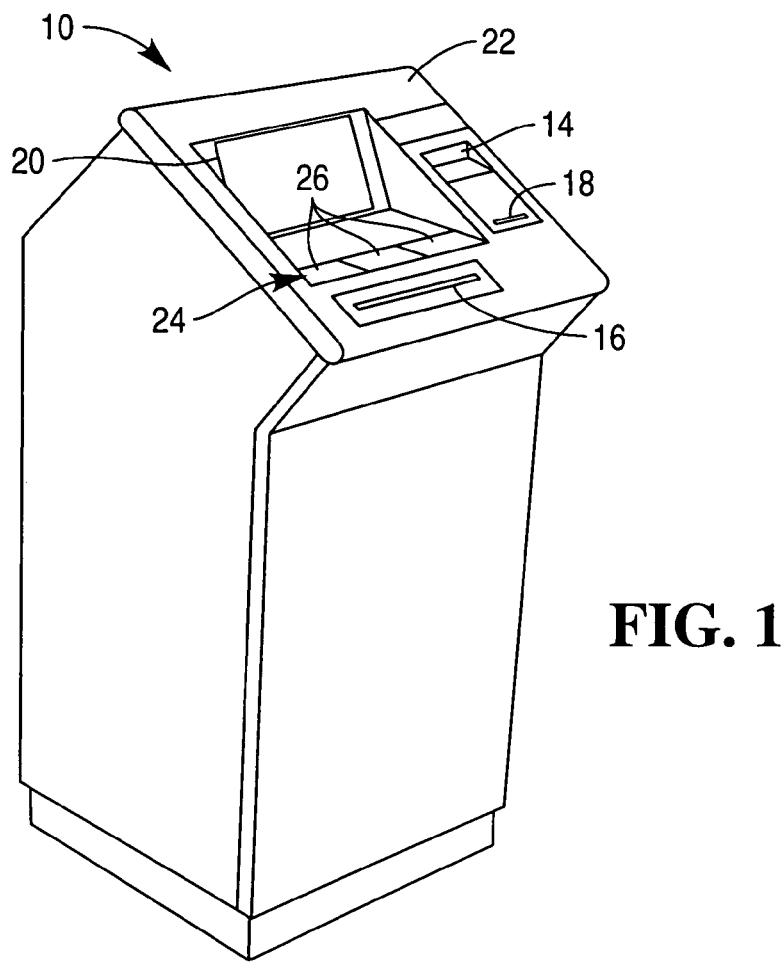
FIG. 1 is a perspective view of an ATM adapted to be in accordance with the invention.
Figure 2:
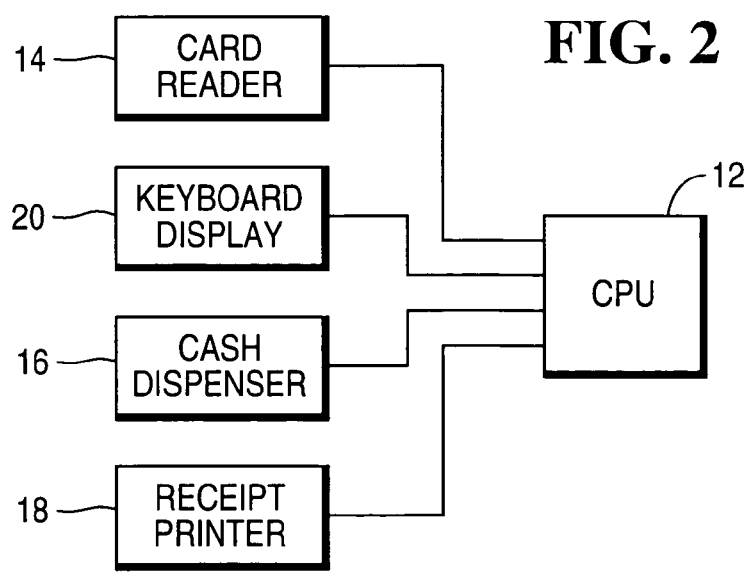
FIG. 2 is a block diagram representation of the ATM of FIG. 1.

Referring to FIGS. 1 and 2, there is shown therein an ATM 10 having a CPU 12 connected to a conventional card reader 14, cash dispenser 16 and receipt printer 18, and to a keyboard 24 in accordance with the invention which, as will be described in more detail later, serves as a data entry means.

The module comprising the card reader 14, the cash dispenser 16 and the receipt printer 18 are respectively associated with slots which are provided in a front panel 22 of the ATM 10 and which in FIG. 1 have the same reference numerals as the respective modules. Thus, the card reader 14 has a card slot through which a user can insert a user's identifying card at the commencement of a transaction to be conducted by the user. The cash dispenser 16 has a cash slot through which currency notes stored inside the dispenser 16 can be delivered to the user during the transaction. The printer 18 has a slot through which an account statement may be delivered to the user or through which a receipt in respect of the transaction is delivered to the user at the termination of the transaction.

The keyboard 24 comprises a plurality of separate individually operable user engageable surfaces 26 arranged in a two-dimensional array. Any selected user engageable surface 26 can be operated in a conventional manner by pressing it down. In the particular embodiment described, the keyboard 24 comprises an array of twelve (3 by 4) individual user engageable surfaces 26, but it should be understood that if desired a different number of user engageable surfaces 24 could be provided. Each user engageable surface 26 is formed by electronic ink on the display, the image displayed by the electronic ink being controlled by the CPU 12. These displays are used to display text, characters, or other images to a user of the ATM 10. Thus, in one embodiment, no separate display means such as a monitor is required. In any event, the figures, numbers, text or other images displayed by each display can be individually controlled and altered under the control of the CPU 12.

Thus the display on each user engageable surface 26 can display a single character. It can also display part of an overall image where this image is displayed across a plurality of user engageable surfaces 24 with the CPU coordinating what is shown by adjoining user engageable surfaces 24. The image may, for example, be a picture, some text or a combination of both.

Each display is formed from a two dimensional dot matrix array of electronic ink. Each dot in the matrix is separately controllable by the CPU 12, in much the same way as a standard dot matrix, to display the desired images on the buttons. The display can be formed in other ways using the electronic ink and it is possible to provide large amounts of text on a standard ATM key tip or button.

Figure 3A:
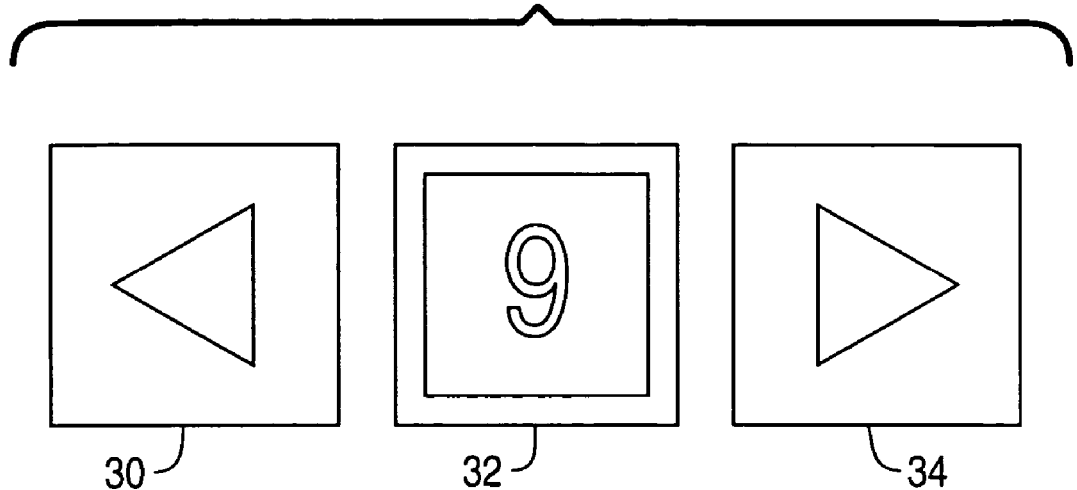
FIGS. 3a & 3b are schematic representations of a 3-button keypad in accordance with the present invention.
Figure 3B:
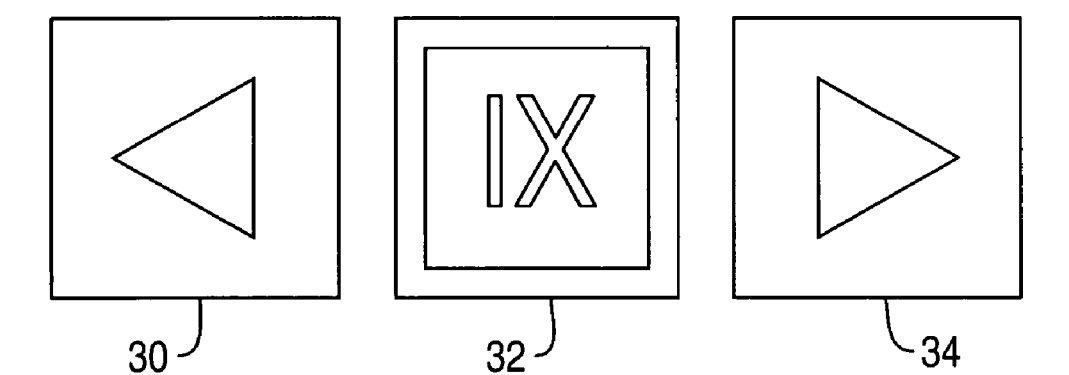

FIGS. 3a & 3b shows one embodiment of the present invention in which all user information, required to operate the terminal and to instigate and control a transaction can be entered using just three buttons, each having a display as described above.

When a card is entered into the card reader 14 (FIG. 2) the central button 32 is actuated so that the display thereon displays a randomly generated number, between 0 and 9. The display is, as above, an electronic ink display. As with the other embodiment described herein the number can be of any script or language such as, for example the Arabic "9" in FIG. 3a or the Roman "IX" in FIG. 3b.

When the number is presented to the user he or she uses on or both of the buttons 30, 34 on either side of the central button 32 to change the number. In particular the left button 30 is used to lower the number sequentially (9 . . . 8 . . . 7 . . . 6 etc.)

each lower number being displayed individually. Likewise the right hand button 34 is used to raise the presented number sequentially (9 . . . 0 . . . 1 . . . 2 etc.). When the central button 32 indicates the first number on the users Personal Identification Number or PIN the user then presses the central button 32 to select the number. This process is repeated until the users full PIN is entered. The same process is thereafter used to navigate a user through the desired transaction. For example, the terminal 10 can be programmed as normal to offer the user a selection of optional services, such as withdrawal of cash or ordering a cheque book. In one embodiment the services are presented on the display on the central button sequentially and the user again depresses the button when the desired service is presented. If that service is the withdrawal of cash a user's normal amount (or any random amount) can then be presented and the user can raise or lower that amount using the outer buttons 30, 34, as before. Thereafter the user can make a selection by pressing the central button when the amount required is presented.

To allow blind users to utilize the same system the central button 32 can be arranged to vibrate on a specific number, say the number "5", or on a user selected number. Hence, once the user knows the starting number they can use the outer buttons 30, 34, as before, to change that number so as to enter their PIN. The same process can be used, at least, for the withdrawal of cash.

This embodiment, in which the buttons themselves display the numbers, has the added, unexpected, result of allowing a user to enter a PIN very privately, thus reducing the problem of shoulder surfing. Also, the facts that the first number is randomly generated and that the user raises and lowers the number on the central button 32 means that even if a shoulder surfer noted the number of key presses they would not be able to determine the actual PIN.

As the PIN is a physical device it is also possible to encrypt the PIN pad to the same standard as presently used PIN pads.

Modifications may be incorporated without departing from the scope of the present invention. For example, the two outer buttons 30, 34 may be replaced by a single button the symbol on which changes if the button is held down. Thereafter, the single button can be used to raise or lower the number presented by the central button 32, as described above.

What is claimed is:

1. An Automated Teller Machine, ATM, comprising:
   a) a central processing unit, CPU,
   b) a keyboard including a plurality of separate, individually depressible keys, each key displaying a visible image which is under control of the CPU, such that
      i) at one time, each key in a group of keys displays a character, and
      ii) at another time, the keys in the group do not display characters, but collectively display a picture, in which
      iii) the keyboard performs a display function, and
      iv) the ATM contains no display, apart from the keyboard.

2. ATM according to claim 1, in which the CPU controls operation of a card reader and cash dispenser of the ATM.

3. ATM according to claim 1, in which the picture includes a text message.

4. ATM according to claim 1, wherein the characters of paragraph (b) (i) include (1) characters of an alphabet of a language, (2) numbers, and (3) punctuation.

5. A method of operating a self service terminal, the method comprising:
   controlling an electronic ink display of a first key in response to a self service terminal user engaging the first key; and
   controlling an electronic ink display of a second key in response to a self service terminal user engaging the second key such that the display of the first key and the display of the second key cooperate to form a picture or a full text message.

6. A method according to claim 5, further comprising controlling an electronic ink display of a third key in response to a self service terminal user engaging the third key such that the display of the first key, the display of the second key, and the display of the third key cooperate to form a picture or a full text message.

7. A method according to claim 5, further comprising controlling at least one of the first and second keys to vibrate when predetermined information is presented on the at least one of the first and second keys.

8. A method according to claim 5, wherein the self service terminal comprises an automated teller machine (ATM).

9. Method according to claim 5, in which the picture contains images other than text and other than characters.

10. A method of operating a self service, terminal SST the method comprising:
    controlling an electronic ink display of a first key in response to a self service terminal user engaging the first key; and
    controlling an electronic ink display of a second key in response to a self service terminal user engaging the second key such that the display of the first key and the display of the second key cooperate to form one of a plurality of keyboard layouts, said one layout forming a collection of data which is a valid entry to the SST.

11. A method according to claim 10, further comprising controlling an electronic ink display of a third key in response to a self service terminal user engaging the third key such that the display of the first key, the display of the second key, and the display of the third key cooperate to form the one of the plurality of keyboard layouts.

12. A method according to claim 10, further comprising controlling at least one of the first and second keys to vibrate when predetermined information is presented on the at least one of the first and second keys.

13. A method according to claim 10, wherein the self service terminal comprises an automated teller machine (ATM).

* * * * *